US012559050B2

(12) United States Patent
Schanzmann et al.

(10) Patent No.: US 12,559,050 B2
(45) Date of Patent: Feb. 24, 2026

(54) TRAILER WITH CURRENT COLLECTOR

(71) Applicants: Martin Schanzmann, Bocholt (DE); Carsten Kaup, Coesfeld (DE); Marnix Lannoije, Altenberge (DE)

(72) Inventors: Martin Schanzmann, Bocholt (DE); Carsten Kaup, Coesfeld (DE); Marnix Lannoije, Altenberge (DE)

(73) Assignee: Schmitz Cargobull AG, Altenberge (DE)

( * ) Notice: Subject to any disclaimer, the term of this patent is extended or adjusted under 35 U.S.C. 154(b) by 228 days.

(21) Appl. No.: 18/339,441

(22) Filed: Jun. 22, 2023

(65) Prior Publication Data

US 2023/0415683 A1    Dec. 28, 2023

(30) Foreign Application Priority Data

Jun. 23, 2022    (EP) .................................... 22180746

(51) Int. Cl.
| | |
|---|---|
| B60R 16/03 | (2006.01) |
| B60H 1/00 | (2006.01) |
| B60P 3/20 | (2006.01) |
| H01R 43/26 | (2006.01) |

(52) U.S. Cl.
CPC ......... B60R 16/03 (2013.01); B60H 1/00428 (2013.01); B60P 3/20 (2013.01); H01R 43/26 (2013.01); *H01R 2201/26* (2013.01)

(58) Field of Classification Search
CPC ....... B60R 16/03; B60H 1/00428; B60P 3/20; H01R 43/26; H01R 2201/26
See application file for complete search history.

(56) References Cited

U.S. PATENT DOCUMENTS

| | | | | |
|---|---|---|---|---|
| 2011/0106349 A1* | 5/2011 | Sakita | ..................... | B60L 15/38 191/22 C |
| 2011/0126566 A1* | 6/2011 | Jones | .................... | F25D 29/003 62/298 |
| 2024/0131960 A1* | 4/2024 | Swar | ....................... | B60L 58/12 |

FOREIGN PATENT DOCUMENTS

| | | |
|---|---|---|
| CN | 112498400 A | 3/2021 |
| DE | 1903746 A1 | 8/1970 |
| DE | 6902879 U | 11/1972 |
| DE | 102016213786 A1 * | 2/2018 |

OTHER PUBLICATIONS

DE102016213786A1 machine translation (Year: 2018).*

* cited by examiner

*Primary Examiner* — Todd Melton
*Assistant Examiner* — Oliver Tan
(74) *Attorney, Agent, or Firm* — Reinhart Boerner Van Deuren P.C.

(57)    ABSTRACT

A trailer, in particular a utility trailer, for road vehicles on which an extendable current collector or an electrical contact element for an inverted current collector is placed.

15 Claims, 3 Drawing Sheets

TRAILER WITH CURRENT COLLECTOR

CROSS-REFERENCE TO RELATED PATENT APPLICATIONS

This patent application claims priority to European Patent Application No. 22180746.4, filed Jun. 23, 2022, the entire teachings and disclosures of the aforementioned application is incorporated herein by reference thereto.

FIELD OF THE DISCLOSURE

Exemplary embodiments of the disclosed subject-matter relate to a trailer for road vehicles, in particular a commercial vehicle trailer.

BACKGROUND

In the course of the advancing electrification of transport, especially road traffic, the area of road-based logistics is not left out. Nowadays, not only private cars, but increasingly also commercial vehicles such as buses, construction machinery or trucks are electrically powered.

Usually, electrified vehicles have an energy storage system. Lithium-ion batteries, for example, are common. These must be charged with energy before they are made available. For this purpose, charging electronics are usually provided on the vehicle.

In the case of commercial road vehicles, it is also common for them to have multiple parts. On the one hand, at least a trailer is often provided and, on the other hand, a motorized commercial vehicle, in particular a towing vehicle, which is coupled to the trailer. Energy storage systems can be located in the motorized commercial vehicle as well as in the trailer. Conventionally, however, the costly and sensitive charging electronics for charging the energy storage devices are arranged in the motorized commercial vehicle.

This results in the problem of a bottleneck in the energy supply to the trailers, especially to the energy storage systems in trailers, of multi-part motorized commercial vehicles.

The long driving times and short rest periods typical of commercial vehicles also pose particularly high challenges for the charging electronics. Conventional charging electronics are often still too slow, even in the case of high-speed charging processes, and cause long breaks in driving.

SUMMARY OF SOME EXEMPLARY EMBODIMENTS OF THE INVENTION

An underlying object of the disclosed subject matter is therefore to be able to supply a trailer for road vehicles with electrical energy in the most time-saving way possible.

In the present case, the object is achieved by a trailer for road vehicles according to claim 1.

According to one aspect of the present teaching, a trailer for road vehicles is disclosed, wherein the trailer contains:

(i) a current collector (200) extendable from a retracted (200) position to an extended position, wherein:

the current collector (200) is located adjacent to an end wall of the trailer (100) pointing in a direction of travel (150) of the trailer (100), wherein:

the current collector (200) in the retracted position is located completely below an upper edge (120) of the end wall, and the current collector (200) in the extended position protrudes at least partly upwards from the upper edge (120) of the end wall, or (ii) an electrical contact element for an inverted current collector, wherein:

the electrical contact element for an inverted current collector is located adjacent to an end wall of the trailer (100) pointing in a direction of travel (150) of the trailer (100), wherein:

the electrical contact element for an inverted current collector is arranged entirely below an upper edge (120) of the end wall.

For example, the trailer in question may be a trailer that is suitable for coupling to a motorized commercial road vehicle. A motorized commercial road vehicle may be a lorry, in particular a towing vehicle such as a trailer towing vehicle, a semi-trailer towing vehicle and/or a towing vehicle. A categorisation of motor vehicles and more detailed definitions of the vehicle types mentioned can be found, for example, in the DIN 70010 standard. In particular, the disclosed trailer for road vehicles may be a commercial vehicle trailer. For example, a commercial vehicle trailer is a trailer for a lorry, such as a rigid drawbar trailer or an articulated drawbar trailer or a semi-trailer. Such commercial vehicle trailers are intended in particular for the transport of goods, preferably general cargo, on public roads. For this purpose, commercial vehicle trailers have different types of commercial vehicle bodies, which are used to accommodate the goods to be transported in a load space. The load space is typically limited by a cargo floor, a roof, as well as exterior walls comprising side walls, an end wall and a rear wall. The end wall limits the load space in the direction of travel, and the rear wall limits the load space in the opposite direction to the direction of travel. For example, box bodies with fixed side walls, a fixed end wall, a rear wall formed by hinged doors and a fixed roof are known, which enclose the load space. Since the box bodies are closed, box bodies are particularly suitable for the transport of moisture-sensitive and/or temperature-sensitive goods, for example for so-called dry transport and/or refrigerated transport. In addition to box bodies, so-called tarpaulin bodies are also known, in which the side walls and the roof are closed by at least one tarpaulin. In tarpaulin superstructures, the end wall is usually designed as a solid wall, while the rear wall is regularly formed by two hinged doors in order to load the load space from behind as required. If a tarpaulin can be moved along the side wall, this is also referred to as so-called curtainsiders. Accordingly, a commercial vehicle body should be understood, for example, as a box body, a tarpaulin body and/or a curtainsider.

The disclosed trailer contains a current collector or an electrical contact element for an inverted current collector. Also, both and/or several current collectors and/or several electrical contact elements may be provided for an inverted current collector.

An electrical contact element for an inverted current collector may be configured to be contacted by an inverted current collector. In particular, the inverted current collector may be arranged on an energy supply facility, in particular a charging infrastructure. In particular, the inverted current collector may be transferable from a retracted to an extended position. For example, the inverted current collector can be configured to contact (for example touch) the electrical contact element for an inverted current collector in the extended position. Furthermore, the inverted current collector may be configured not to contact (for example not to touch) the electrical contact element for an inverted current collector in a retracted position. The inverted current collector may be constructed analogously to the current collector described herein according to exemplary embodiments of the trailer. In the following, when we refer to the current collector, we mean the current collector of the trailer. In this context, disclosures in connection with the current collector of the trailer should also apply to the inverted current collector, insofar as this is reasonable for the person skilled in the art.

In particular, the current collector or the electrical contact element for an inverted current collector is configured to receive electrical energy provided by an external electrical power supply. In this context, an external electrical power supply should be understood, for example, as an electrical power supply network external to the trailer (for example a public energy supply network) and/or an electrical power supply external to the trailer (for example a battery and/or an electrical generator such as an electrical generator driven by an internal combustion engine and/or wind power).

For example, the current collector is configured to be able to establish a mechanical contact and an electrical contact to an energy supply element (for example in the form of an electrical contact element of the external power supply). Similarly, the electrical contact element for an inverted current collector is configured, for example, to be contacted by an energy supply element of the external power supply (for example, in the form of a contact element of the inverted current collector) in order to establish mechanical and electrical contact with the energy supply element of the external power supply. For example, contact can be direct or indirect (for example via at least one other element). Receiving electrical energy by the current collector or the electrical contact element for an inverted current collector can accordingly be carried out conductively. Conductively receiving the electrical energy provided by the external energy supply is to be understood as the fact that the current collector or the electrical contact element for an inverted current collector is in mechanical contact and electrical contact with the energy supply element of the external energy supply and that receiving the energy takes place at least essentially at the point of contact. This has the advantage of particularly low ohmic losses when receiving energy. Direct current can also be transmitted. It should be understood, however, that the disclosed subject matter is not limited to receiving the electrical energy provided by the external power supply conductively. In addition or alternatively, it is possible, for example, to realize receiving the electrical energy provided by the external power supply inductively by the current collector or the electrical contact element for an inverted current collector. Inductive electrical energy transfer has the advantage that receiving energy can also take place without mechanical contact and electrical contact between the energy supply element of the electrical energy supply and the current collector or the electrical contact element for an inverted current collector.

When we refer to the provision or transmission of energy here below and/or above, this means at least the provision or transmission of power, among other things. Conversely, the provision or transmission of power should also be understood as the provision or transmission of energy.

The disclosed current collector is extendable from a retracted position to an extended position. In particular, the disclosed current collector may additionally or alternatively be retractable into a retracted position, in particular from the extended position.

The electrical contact element for an inverted current collector may be at least partly or entirely immovable. For example, the electrical contact element for an inverted current collector may include components that are firmly connected to each other. Also, the electrical contact element for an inverted current collector may include at least one moving component. For example, a contact of the electrical contact element for an inverted current collector may be spring-mounted, especially on other components of the electrical contact element for an inverted current collector.

The current collector is at least partly movably mounted. For example, the current collector includes at least one moving part. In particular, the current collector may contain at least one movable element, wherein the movable element is movably mounted. By moving the at least one moving element, the current collector can be retracted and/or extended. The current collector may also contain several movable elements, which are preferably at least partly connected to each other and/or are movably mounted on each other.

For example, the current collector can contain at least one movable element which is rotatably mounted, for example. By rotating the movable element, it can be changed in position, in particular an area of the element that is spaced apart from the rotatable mounting, in particular it can be moved along a circular path.

For example, the current collector may additionally or alternatively contain a movable element, which is essentially movably mounted along a straight line. By moving the element along the straight line, the position of the moving element can be changed.

A movement at least of the at least one moving element may cause the current collector to extend and/or retract.

In an exemplary embodiment, the current collector may include a pantograph. A pantograph can include at least four elements. Each element is connected to two other elements by a swivel joint at a respective connection position. The pantograph thus contains at least four swivel joints at four different connection positions. The connection positions can essentially be in a plane. The swivel joints can allow movement along a respective rotation plane. The planes of rotation of the swivel joints can be essentially parallel to each other. A spacing distance can be defined between the two swivel joints of a respective element, which extends in particular from the connection position of a first of the swivel joints to the connection position of the second of the swivel joints of the element. The spacing distances of a first pair of a first and a second of the at least four elements can be essentially parallel to each other. The spacing distances of a second pair of a third and a fourth of the at least four elements may be essentially parallel to each other. At least one element can protrude beyond at least one of its swivel joints along the orientation of the respective spacing distance. Thus, the element can be longer than the spacing distance in the direction of the spacing distance.

By means of the pantograph, an increased movement of at least areas of the current collector can be achieved. In particular, a first moving part of the current collector may be moved along a first distance and at least a second part different from the first part of the current collector may thereby be moved along a second distance, wherein the second distance is greater than the first. The movement of the first part can be caused, for example, by means of an actuator. The pantograph enables a compact design of the current carrier with high configurability at the same time. Current collectors that contain a pantograph are also known as pantograph current collectors and/or scissors current collectors and are known in particular from rail vehicles.

For example, the current collector may have an actuator. For example, the actuator may be configured to influence the position and/or orientation of at least part of the current collector. For example, the actuator may be a motor, such as a linear motor, a rotary motor, and/or combinations thereof. Particularly advantageous is the use of a servo motor, with which a given motor position, for example an angular position of a rotary motor or a position of a linear motor, can be adjusted and maintained. Other actuators are also possible, such as hydraulic or pneumatic actuators, thermoformable materials and/or combinations thereof.

In particular, the actuator is configured to move at least one moving part, i.e. at least one moving element, of the current collector. For example, the actuator may be configured to move the current collector to the extended position and/or to the retracted position.

Several actuators can also be provided. Thus, a first actuator may be configured to move the current collector to the extended position, and a second actuator, in particular different from the first, may be configured to move the current collector to the retracted position.

The current collector or the electrical contact element for an inverted current collector may have at least one immovable part.

For example, the immovable part of the current collector or the electrical contact element for an inverted current collector may include a holder. In particular, the holder may be configured to hold at least one or all of the moving parts of the current collector in place, especially in the retracted position. For example, the holder may include a device for positive or non-positive fixing of at least one moving element of the current collector. For example, the holder may include a gripping device and/or a clamping device. For example, at least one moving part of the current collector can be received by at least a part of the holder and fixed by it in a position, especially in the retracted position. For example, an actuator of the current collector can move the at least one moving part of the current collector into the holder. An actuator can also move the holder in such a way that it fixes the current collector. For example, a gripper can be closed and opened by an actuator of the holder, in particular in such a way that the holder can fix the current collector in the retracted position.

The current collector of the disclosed trailer is arranged adjacent to an end wall of the trailer pointing in a direction of travel of the trailer. The direction of travel of the trailer is the usual forward direction of the trailer combination and the motorized commercial vehicle coupled to it. The direction of travel of the trailer is therefore the direction in which the trailer is pulled by a towing vehicle in normal operation. In particular, the motorized commercial vehicle is located in front of the trailer in the direction of travel.

An end wall of the trailer is a part of the outer wall and/or outer skin of the trailer. The end wall is located at the end of the trailer facing in the direction of travel and/or limits the load space of the trailer in the direction of travel. For example, the end wall can be essentially perpendicular to the direction of travel.

In particular, a common trailer shape has an essentially cuboid shape. An upper and a lower trailer plane are essentially parallel to each other and essentially perpendicular to the direction of gravity. For example, the upper trailer plane runs along a roof of the trailer, and the lower trailer plane runs along a loading floor of the trailer, for example. A first and a second lateral trailer plane are arranged essentially parallel to each other and are essentially parallel to both the direction of travel and the direction of gravity. For example, each of the lateral trailer planes runs along a respective side wall of the trailer. In addition, a front and a rear trailer plane can be defined, each of which is essentially perpendicular to the direction of travel and runs along the end wall (front trailer plane) or the rear wall (rear trailer plane).

When an essentially perpendicular orientation is referred to here and below, it includes angular ranges of 90° with a tolerance of less than +/−1°, +/−2°, +/−5°, +/−10°, +/−+/−20°, +/−25° or +/−30°.

When an essentially parallel orientation is referred to here and below, it includes angular ranges of 0° with a tolerance of less than +/−1°, +/−2°, +/−5°, +/−10°, +/−+/−20°, +/−25° or +/−30°.

If a plane is defined essentially perpendicular to a particular direction, this is equivalent to aligning the surface normals with the respective plane, which is essentially parallel to the particular direction.

If a first plane is essentially parallel to a second, other plane, this means in particular that the surface normals of the respective planes, the first and the second, are oriented essentially parallel to each other.

If a plane is essentially parallel to a particular direction, it means in particular that a surface normal is essentially perpendicular to the particular direction.

Specifically, if a plane is essentially perpendicular to a particular direction, it means that a normal vector of the plane is oriented essentially parallel to that particular direction.

If a first direction is essentially oriented in the direction of a second direction, this means in particular that the scalar product between a first direction vector parallel to the first direction and a second direction vector parallel to the second direction is positive. In particular, this may mean that the angle enclosed between the first direction and the second direction is 0° with a tolerance of less than +/−1°, +/−2°, +/−5°, +/−10°, +/−15°, +/−20°, +/−25° or +/−30°.

When a plane points in the direction of a certain direction, it means in particular that a surface normal of the plane is oriented in the direction of the certain direction.

The end wall of the trailer is located at the end of the trailer facing in the direction of travel. It is used, for example, to limit the load space of the trailer in the direction of travel. For example, the end wall faces in the direction of travel of the trailer. For example, the end wall is oriented at least partly parallel to a plane (for example the front trailer plane) that points in the direction of travel.

The current collector or the electrical contact element for an inverted current collector is located adjacent to the end wall. This means, for example, that the current collector or the electrical contact element for an inverted current collector is at least partly in front of the end wall in the direction of travel. For example, it may be provided that the extension plane, along which the current collector can be retracted and extended, is located in front of the end wall in the direction of travel.

For example, the current collector or the electrical contact element for an inverted current collector may be at least partly in direct contact with at least part of the end wall. Also, the current collector or the electrical contact element for an inverted current collector may be at least partly or completely spaced apart from the end wall in the direction of travel.

For example, the current collector or the electrical contact element for an inverted current collector may be mechanically attached to the trailer. For example, the current collector or the electrical contact element for an inverted current collector may be in direct contact with a part of the trailer. Alternatively or additionally, the current collector or the electrical contact element for an inverted current collector may, for example, be indirectly connected to the trailer by at least one other element, for example a retaining element that is different from the current collector or the electrical contact element for an inverted current collector.

In particular, the current collector or the electrical contact element for an inverted current collector may be attached, for example, to the end wall facing in the direction of travel or to an element located on the end wall facing in the direction of travel. In addition or alternatively, the current collector or the electrical contact element for an inverted current collector may be attached to an area of the trailer other than the end wall. For example, the current collector or the electrical contact element for an inverted current collector may be attached to a side wall of the trailer, which is, for example, essentially parallel to a lateral trailer plane, or to both side walls. Also, the current collector or the electrical contact element for an inverted current collector may be attached, for example, to a part of a coupling of the trailer. It is also possible that the current collector or the electrical contact element for an inverted current collector is attached to part of a trailer underbody, to a chassis and/or to part of the roof of the trailer.

For example, the current collector or the electrical contact element for an inverted current collector may be mechanically connected, with the at least one immovable part thereof, to the trailer.

The end wall of the trailer has an upper edge. The upper edge describes the upper end of the end wall. In addition to the upper edge, an end wall can contain, for example, a lower edge and two side edges. For example, the end wall touches the roof of the trailer at its upper edge, the loading floor of the trailer at its lower edge, and the side walls of the trailer at its side edges. For example, in the case of a rectangular end wall, the edges of the end wall are straight lines. For example, the upper edge in this case is a straight line which is oriented essentially parallel to the end wall and runs essentially perpendicular to the direction of gravity and along the upper end of the end wall.

If a first element is placed above a second element, this means here and below that all parts of the second element are in front of the first element in the direction of gravity. Gravity essentially points towards the centre of a planet on which the first and second elements are located. In other words, the distance of all parts of the second element from the centre of a planet on which the two elements are located is less than the distance of all parts of the first element from the centre.

The current collector or the electrical contact element for an inverted current collector, in particular the current collector in the retracted position, is arranged entirely below the upper edge of the end wall.

In addition or alternatively, the current collector in the retracted position or the electrical contact element for an inverted current collector may be arranged at least approximately entirely below the upper edge. For example, at least 99%, 98%, 95%, 90% or 85% of the current collector or the electrical contact element for an inverted current collector, in particular of its volume and/or cross-sectional area projected in the direction of travel, may be located below the upper edge of the end wall.

An arrangement of the current collector in the retracted position or the electrical contact element for an inverted current collector below the upper edge has the advantage that given height restrictions of the trailer can be complied with even in the presence of a current collector or an electrical contact element for an inverted current collector.

The fact that the current collector or the electrical contact element for an inverted current collector is arranged below the upper edge means that it is protected from mechanical influences. Damage to the current collector or the electrical contact element for an inverted current collector is therefore particularly unlikely. In particular, the current collector in the retracted position or the electrical contact element for an inverted current collector does not provide significant wind resistance for the trailer. In this way, the operation of the trailer is particularly efficient and, in particular, its efficiency is not impaired by the provision of a current collector or the electrical contact element for an inverted current collector on the trailer.

The current collector can protrude at least partly upwards from the upper edge of the end wall, especially when in the extended position.

If a first element protrudes upwards beyond a second element, this means in particular that at least a part of the first element is arranged in front of the second element in the direction of gravity. In other words, at least a part of the first element is more distant from the centre of a planet on which the first and second elements are located than all parts of the second element.

In a disclosed embodiment, at least part of the current collector is thus arranged above the upper edge of the end wall in the extended position.

For example, at least one movable element of the current collector may be located above the upper edge of the end wall in the extended position.

According to an exemplary embodiment of the trailer,
a housing of a transport refrigeration machine is arranged on the end wall, wherein the current collector or the electrical contact element for an inverted current collector is arranged at least partly above the housing of the transport refrigeration machine and/or to the side of the housing of the transport refrigeration machine, in particular the current collector (200) in the retracted position.

The trailer may contain at least one transport refrigeration machine.

The transport refrigeration machine may be configured to control the temperature of a load space of the trailer, in particular to cool and/or heat it. For example, such a transport refrigeration machine can generate cooled air that is blown into the load space of the trailer. For this purpose, the transport refrigeration machine may contain a refrigeration circuit with a compressor driven by an electric motor to compress a refrigerant, a condenser, a throttle device and an evaporator. In the cooling circuit, the refrigerant compressed by the compressor flows to the heat exchanger via the condenser and a throttle device, which can be in the form of a control valve, for example, arranged after the condenser in the direction of flow. In the heat exchanger, the previously liquefied refrigerant is expanded, extracting heat from an air flow passed through the evaporator separately from the refrigerant, so that the air of the air flow is cooled. The cooled air from this air flow is then blown into the load space of the trailer to cool it. Also, the transport refrigeration machine can contain at least one temperature sensor. For example, the transport refrigeration machine may also contain a control element, such as a hysteresis-based controller based on a temperature determined by the temperature sensor, in particular a temperature in the load space of the trailer.

The transport refrigeration machine contains at least one housing. For example, the housing can enclose some of the parts of the transport refrigeration machine that are different from the housing. In particular, the housing of the transport refrigeration machine may enclose at least most or substantially all of the parts of the transport refrigeration machine that are different from the housing.

For example, the housing can be made partly open. In particular, the housing may have cooling openings such as ventilation grilles, perforations of the housing, nets, slots and/or combinations thereof.

Also, the housing may be substantially enclosed, in particular essentially entirely, in particular gas-tight, fluid-tight and/or pressure-tight.

For example, the housing may be configured to dissipate heat to the environment. For example, heat can be dissipated into the environment by heat conduction and/or thermal radiation. For this purpose, the housing can have, for example, at least one or more cooling fins. It is also possible to release heat into the environment by convection by means of a cooling opening. This can be ensured passively by the free exchange of air through a cooling opening. Alternatively or additionally, ventilation of the transport refrigeration machine may cause an air flow from the housing of the transport refrigeration machine.

For example, the housing of the transport refrigeration machine may be at least partly made of a metallic material, such as aluminium, steel or other metallic materials.

Preferably, the housing of the transport refrigeration machine may be arranged on the end wall in such a way that it is in front of the end wall of the trailer in the direction of travel.

The housing of the transport refrigeration machine can be connected to the end wall of the trailer. However, it is understood that the housing of the transport refrigeration machine may alternatively or additionally be attached to another part of the trailer, such as a side wall, a roof, an underbody, a chassis, a coupling of the trailer and/or combinations thereof. For example, the housing of the transport refrigeration machine can be attached to a part of the trailer such as an outer wall of the trailer. Examples of attaching the housing of the transport refrigeration machine to a part of the trailer are a positive connection (for example a screw connection, riveting, and/or locking of the transport refrigeration machine to the part of the trailer) or a material connection (for example a welded connection to the part of the trailer) or a non-positive connection (for example a clamp connection).

The current collector or the electrical contact element for an inverted current collector may touch the housing of the transport refrigeration machine. In particular, at least part of the current collector or the electrical contact element for an inverted current collector may touch the top of the housing of the transport refrigeration machine.

The current collector or the electrical contact element for an inverted current collector, in particular the current collector in the retracted position and/or in the extended position, may be arranged at least partly above the transport refrigeration machine and in front of the end wall of the trailer in the direction of travel. One of the advantages of such an arrangement is that the current collector can be extended upwards into the extended position unhindered or the electrical contact element for an inverted current collector can be contacted from above by an inverted current collector (for example in an extended position of the inverted current collector).

In particular, it was recognized that in typical arrangements of the housing of the transport refrigeration machine on the end wall of a trailer, a distance remains between the transport refrigeration machine and the upper edge of the end wall, which can be used by an arrangement of the current collector or the electrical contact element for an inverted current collector at the top of the housing of the transport refrigeration machines. For example, this distance may be due to the fact that the transport refrigeration machine is suitable for different trailer geometries and therefore is not dimensioned to fill the end wall. Also, in some cases, the area above the transport refrigeration machine is left free for cooling purposes. Thus, it was also recognized that an arrangement of the current collector or the electrical contact element for an inverted current collector above the transport refrigeration machine does not entail any appreciable impairment of the heat dissipation from the transport refrigeration machine into its environment due to the compact dimensions of the current collector or the electrical contact element for an inverted current collector. On the contrary, in many designs of the current collector, its often-branched structure can be conducive to heat dissipation. The current collector can thus perform the functions of an increase of the surface area of the transport refrigeration machine and thus act as a kind of cooling fin. In particular, the arrangement in the area above the transport refrigeration machine, where a high level of air exchange can take place, can thus have advantages for heat dissipation.

In addition, the current collector or the electrical contact element for an inverted current collector may be arranged, in particular, at least partly in front of the housing of the transport refrigeration machine in the direction of travel and/or to the side of the housing of the transport refrigeration machine. In this case, too, the current collector may be configured to extend from the retracted position to the extended position and vice versa without being hindered by the transport refrigeration machine, in particular the housing of the transport refrigeration machine. The electrical contact element for an inverted current collector may be configured in such a way that it can be contacted from above by an inverted current collector without the inverted current collector being obstructed by the transport refrigeration machine, in particular by the housing of the transport refrigeration machine.

According to an exemplary embodiment of the trailer, the current collector or the electrical contact element for an inverted current collector is attached to the housing of the transport refrigeration machine. In particular, the current collector or the electrical contact element for an inverted current collector may be attached to an upper surface of the transport refrigeration machine housing.

For example, an immovable part of the current collector may be attached to the housing of the transport refrigeration machine.

The fastening of the current collector (for example the immovable part of the current collector) or the electrical contact element for an inverted current collector to the housing of the transport refrigeration machine can be carried out, for example, in the form of a positive connection, a non-positive connection and/or a material connection. Such a connection between the current collector or the electrical contact element for an inverted current collector and the housing of the transport refrigeration machine may be fixed. In particular, a fixed connection can be understood as an essentially rigid connection, so that the relative position between the housing of the transport refrigeration machines (and thus the trailer) and the current collector or the electrical contact element for an inverted current collector is essentially fixed (for example apart from the remaining residual mobility relative to each other due to the natural elasticity of the respective materials of the respective elements (for example the housing of the transport refrigeration machine and the current collector or the electrical contact element for an inverted current collector).

According to an exemplary embodiment, the transport refrigeration machine and the current collector or the electrical contact element for an inverted current collector are manufactured as a coherent component. For example, the current collector or the electrical contact element for an inverted current collector and the transport refrigeration machine may be at least partly enclosed in a common housing. Also, the current collector or the electrical contact element for an inverted current collector and the transport refrigeration machine may be made attached to each other, for example in one of the ways described above.

According to an exemplary embodiment of the trailer, the current collector (200) is configured to make contact with an electrical contact element of a charging infrastructure (240) in the extended position, and/or the electrical contact element for an inverted current collector is configured to make contact with an inverted current collector of a charging infrastructure (for example, to be contacted by the inverted current collector, for example in an extended position of the inverted current collector).

The electrical contact element of a charging infrastructure and/or the inverted current collector is not part of the trailer. For example, the electrical contact element of a charging infrastructure and/or the inverted current collector is part of a charging infrastructure such as a charging station.

The electrical contact element of a charging infrastructure or the inverted current collector of a charging infrastructure may be arranged above the upper edge of the trailer end wall and/or above the current collector.

The current collector or the electrical contact element for an inverted current collector may contain one or more electrical contact areas. Example designs of such a contact area are a sliding contact, a rubbing contact, a slip bar, a carbon brush, a graphite sliding contact, a plug contact (for example a plug), a receiving contact (for example a socket), a spring-loaded contact and/or combinations thereof. It is assumed below by way of example that the current collector or the electrical contact element for an inverted current collector contains at least two electrical contact areas. Each of the contact areas of the current collector is used, for example, to establish at least one respective electrical contact with the electrical contact element of a charging infrastructure; and each of the contact areas of the electrical contact element for an inverted current collector is used, for example, to establish at least one respective electrical contact with the inverted current collector of a charging infrastructure Accordingly, the electrical contact element of the charging infrastructure has, for example, its corresponding contact area for each of the contact areas of the current collector; and the inverted current collector has a corresponding contact area for each of the contact areas of the electrical contact element for an inverted current collector. Each of the contact areas of the current collector or of the electrical contact element for an inverted current collector is electrically connected by an electrical conductor to other components of the current collector and/or of the electrical contact element for an inverted current collector and/or of the trailer.

Where the current collector or the electrical contact element for an inverted current collector establishes contact with the electrical contact element of a charging infrastructure or the inverted current collector of a charging infrastructure, this may be done in particular in the area of the at least two contact areas of the current collector or of the electrical contact element for an inverted current collector.

As previously disclosed, the current collector may be configured to be moved from a retracted position to an extended position. Also, the current collector may be configured to be moved from the extended position to the retracted position. For example, a moving part of the current collector in the extended position protrudes at least partly above the upper edge of the end wall of the trailer.

The at least two contact areas of the current collector may be located, in particular, in the area of the moving part of the current collector. When the current collector is moved to the extended position, the position of the contact areas is changed. In particular, the contact areas may be located above the upper edge of the end wall in the extended position. For example, the current collector is configured in such a way that a respective contact area of the current collector establishes a respective contact with the contact element of a charging infrastructure in the extended position.

Furthermore, the current collector may be configured in such a way that the at least two contact areas are essentially the highest areas of the current collector in the extended position. In this way it can be achieved, for example, that the contact areas of the current collector first make contact with the electrical contact element of a charging infrastructure when the current collector is moved to the extended position if the electrical contact element of a charging infrastructure is arranged above the current collector.

The electrical contact element of a charging infrastructure is to be understood, for example, as an electrical contact element of an external electrical power supply. As disclosed above, an electrical power supply can be understood, for example, as an electrical power supply network external to the trailer (for example a public power supply network) and/or an electrical power supply external to the trailer (for example a battery and/or an electric generator such as an electric generator driven by an internal combustion engine and/or wind power). An example of such an electrical contact element of a charging infrastructure is an overhead line and/or an electrical contact element of a charging station. For example, the charging station can be located at a so-called charging point.

For example, the electrical contact element of a charging infrastructure is configured in such a way that the current collector can conductively receive electrical energy provided by the external electrical energy supply via the electrical contact element of a charging infrastructure if there is electrical contact between the current collector and the electrical contact element of a charging infrastructure (for example between the at least one electrical contact area of the current collector and at least one corresponding contact area of the electrical contact element of a charging infrastructure). For example, the inverted current collector is configured in such a way that the electrical contact element for an inverted current collector can conductively receive electrical energy provided by the external electrical power supply via the inverted current collector if there is an electrical contact between the electrical contact element for an inverted current collector and the inverted current collector of a charging infrastructure (for example between the at least one electrical contact area of the electrical contact element for an inverted current collector and at least one corresponding contact area of the inverted current collector of a charging infrastructure).

For example, the current collector can be configured in such a way that it can establish the contact with the electrical contact element of a charging infrastructure when the trailer is stationary and can receive electrical energy via the contact.

In addition or alternatively, the current collector can also be configured in such a way that it can establish contact with the electrical contact element of a charging infrastructure while driving. For this purpose, the current collector has in particular sufficient mechanical strength to enable the current collector to hold firm despite any frictional forces that may occur between the electrical contact element of a charging infrastructure and the current collector and/or resulting leverage forces. For example, the electrical contact element of a charging infrastructure may be implemented as an overhead line.

According to an exemplary embodiment of the trailer, the current collector is in the form of a bow current collector, in particular as a scissors current collector, a triangular current collector, a single-arm current collector and/or combinations thereof.

According to an exemplary embodiment of the trailer the current collector is configured to be moved from the retracted position to the extended position along an extension plane, wherein the extension plane is essentially perpendicular to the direction of travel.

The current collector can therefore be configured to be moved along an extension plane from the retracted position to the extended position. For example, the retraction from the extended position to the retracted position can also take place along the extension plane.

For example, the extension plane should be understood as the plane in space along which the movable elements of the current collector move when the current collector is extended and/or retracted. In particular, when extending and/or retracting essentially all points of the moving parts of the current collector move in respective paths, which essentially run parallel to the extension plane (for example apart from random deviations due to tolerances of the mounting of the moving parts).

For example, the current collector may have at least one rotatably supported element that rotates around its mounting in the extension plane. In particular, the current collector may be in the form of or contain a scissors current collector, also known as a pantograph current collector. The scissors current collector can be extended and/or retracted in an extension plane.

For example, the extension plane can run essentially perpendicular to the direction of travel and parallel to the end wall. In this way, it is possible to ensure that the volume occupied by the current collector over all its positions in the direction of travel between and including the retracted position and the extended position remains limited. Furthermore, such a course of the extension plane makes it possible to provide for a short extension of the current collector in the direction of travel. In this context, a short extension of the current collector in the direction of travel is to be understood in particular as a short extension of the current collector in the direction of travel compared to the extension of the current collector in the lateral direction.

It was recognized that the available volume in which the current collector can be arranged is limited at the end wall of the trailer in the direction of travel, i.e. for example between the towing vehicle and the end wall of the trailer. On the other hand, the available volume in the lateral direction is less limited. Accordingly, a course of the extension plane essentially perpendicular to the direction of travel and parallel to the end wall allows particularly good utilization of the available volume in which the current collector can be arranged.

According to an exemplary embodiment of the trailer the electrical contact element for an inverted current collector or the current collector, both in the extended position and in the retracted position, does not protrude from the side edge of the end wall and/or side wall of the trailer.

Where the current collector or the electrical contact element for an inverted current collector does not protrude from the side edge of the end wall, this means, in particular, that the projection of the current collector or the electrical contact element for an inverted current collector on the end wall is located between the side edges of the end wall. For example, if the current collector or the electrical contact element for an inverted current collector does not protrude from the side wall of the trailer, this means, for example, that the current collector or the electrical contact element for an inverted current collector is located between the side walls within an imaginary extension of the side walls of the trailer in the direction of travel. Thus, in particular the current collector or the electrical contact element for an inverted current collector does not protrude laterally beyond the end wall and/or the side walls. The current collector or the electrical contact element for an inverted current collector is therefore located within the side edges of the end wall and/or the side walls of the trailer.

In particular, the current collector does not protrude from the side edges of the end wall, either in the extended position or in the retracted position. For example, the current collector or the electrical contact element for an inverted current collector does not protrude from the side edges in any other position of the current collector, in particular not where the current collector is in a transitional position during retraction and/or extension.

According to an exemplary embodiment of the trailer, the trailer contains a housing of the current collector or the electrical contact element for an inverted current collector. For example, the housing may be configured to at least partly enclose the current collector or the electrical contact element for an inverted current collector, in particular the current collector in the retracted position, in particular on the side of the current collector or the electrical contact element for an inverted current collector facing in the direction of travel. For example, the housing can be in the form of a housing that is open upwards. Alternatively or additionally, the housing may describe a volume that is bounded by a housing wall, at least behind the current collector or the electrical contact element for an inverted current collector in the direction of travel. In this way, the current collector or the electrical contact element for an inverted current collector, in particular the current collector in the retracted position, can be protected from airflow and other influences. Also, in addition or alternatively, the housing may at least substantially surround the current collector or the electrical contact element for an inverted current collector with side walls, so that in a projection along the direction of gravity the housing describes an essentially closed line around the current collector or the electrical contact element for an inverted current collector. As a result, the current collector or the electrical contact element for an inverted current collector can be protected on all sides against environmental influences and, for example, vandalism. At least one or substantially all of the wall sections of the housing may protrude beyond the current collector or the electrical contact element for an inverted current collector, in particular the current collector in the retracted position. At the same time, the housing can be open at the top. As a result, it is still possible for the current collector to be transferred from the retracted to the extended position or for the electrical contact element for an inverted current collector to be contacted from above by an inverted current collector.

According to an exemplary embodiment of the trailer
the current collector or the electrical contact element for an inverted current collector contains at least two electrical contact areas.

By using at least two contact areas, energy transfer can be made possible solely by the current collector or the electrical contact element for an inverted current collector. In particular, unlike with current collectors or electrical contact elements for an inverted current collector with only one contact, no grounding contact on the ground is required.

According to an exemplary embodiment of the trailer, the at least two electrical contact areas are spaced apart along a contact row axis.

The contact areas of the current collector or the electrical contact element for an inverted current collector are spaced apart along a contact row axis. In particular, the at least two contact areas align with each other in the direction of the contact row axis.

The current collector or the electrical contact element for an inverted current collector may contain 2, 3, 4, 5, 6, 7, 8, 9, 10 or more contact areas. For example, larger numbers of contact areas can enable the transmission of rotary current with, for example, three phases. Also, for example, at least one contact area can be used for the transmission of control signals.

According to an exemplary embodiment of the trailer, the contact row axes are oriented essentially parallel or perpendicular to the direction of travel.

The contact row axis can be oriented essentially parallel to the direction of travel. Also, the contact row axis can be oriented essentially perpendicular to the direction of travel.

Alternatively or additionally, the contact areas may be oriented essentially parallel to the extension plane. In one embodiment, the contact row axis may be oriented essentially perpendicular to the extension plane. This can have the advantage that the contact areas come into contact with the respective electrical contacts essentially simultaneously when the current collector is transferred from the retracted to the extended position.

According to an exemplary embodiment of the trailer, the trailer contains an energy storage device. In particular, the energy storage device may be implemented as an electrical energy storage device, in particular as a battery and/or accumulator. For example, the electrical energy storage device can be implemented as a lithium-ion accumulator.

The electrical energy storage device can be a high-voltage energy storage device, which can provide electrical voltages of at least 100V, 200V, 400V, 800V, 1500V 2000V, 4000V, 10 kV, 20 kV, 50 kV or 100 kV.

The electrical energy storage device may contain at least one storage module. Several energy storage modules are also conceivable. By using multiple storage modules, the voltage provided and/or the capacity of the electrical energy storage device can be increased. Dividing the energy storage device into modules also has the advantage that the electrical energy storage system can be stowed away in parts of the trailer in a space-saving manner and that the weight is evenly distributed. In particular, the storage modules can be spatially separated from each other. The storage modules can also be arranged in close proximity to each other, especially in contact with each other.

It should be understood, however, that the present disclosure is not limited to electrical energy storage. Other types of energy storage, such as a tank for fuels such as diesel or gasoline or hydrogen, or combinations thereof, are also conceivable.

The energy storage device can be configured to be charged with energy provided by an external power supply. The energy provided by an electrical power supply can be received, for example, via the current collector or the electrical contact element for an inverted current collector. In addition, a connection may be provided between the current collector or the electrical contact element for an inverted current collector, in particular the contact area(s) of the current collector or the electrical contact element for an inverted current collector, and the energy storage device, through which the electrical energy received by the current collector or the electrical contact element for an inverted current collector can be made available to the energy storage device for charging. The connection between the current collector or the electrical contact element for an inverted current collector, in particular the contact area(s) of the current collector or the electrical contact element for an inverted current collector, and the energy storage device contains, for example, one or more electrical conductors. Furthermore, one or more electrical and/or electronic components such as a protective filter and/or a voltage converter and/or a charging management system may be arranged in this connection. Alternatively or additionally, it is also conceivable that the trailer contains a connector such as a plug or socket (for example a CEE plug or a CEE socket) for connection to the external power supply.

Furthermore, it may alternatively or additionally be provided that the energy storage device is configured to be charged with electrical energy provided by an electric generator of the trailer. For example, the electric generator of the trailer can be driven by an internal combustion engine and/or by an axle of the trailer.

According to an exemplary embodiment of the trailer, the trailer has a connector for making an electrical connection.

In particular, the connector can be in the form of a plug or a socket. In particular, the connector is configured to establish an electrical connection with a motorized commercial vehicle for the transmission of electrical energy. In particular, the motorized commercial vehicle can be a towing vehicle to which the trailer can be coupled.

The connector may also be configured to provide an electrical connection to another trailer.

The connector can also be configured so that the trailer receives electrical energy via the connector. For example, the trailer can receive electrical energy via the connector from a commercial vehicle, in particular from a towing vehicle, which is coupled in particular to the trailer. The connector may also be configured to be connected to a power supply network, in particular in such a way that the trailer receives energy from the power supply network, for example from a charging station or other element of a charging infrastructure.

The connector can therefore enable a bidirectional flow of energy to and from the trailer. It is also possible that the connector only allows an electrical energy flow unidirectionally either from the trailer or to the trailer.

The connector, if it contains a socket and/or a plug, can be adapted to the geometry in a charging station (for example, as Type 1 J1772, Type 2 Mennekes, CHAdeMo, CCS Combo Type 1, CCS Combo Type 2, GB/T or Supercharger) and/or may contain a regular power plug (for example, a CEE plug).

According to an exemplary embodiment of the trailer, the energy storage device is configured to provide electrical energy for the operation of one or more consumers of the trailer and/or one or more consumers of a motorized commercial vehicle coupled to the trailer (for example a towing vehicle). For this purpose, a respective connection between the energy storage device and the respective consumer may be provided, through which the energy storage device can provide the respective consumer with electrical energy for the operation of the respective consumer. The respective connection between the energy storage device and the respective consumer contains, for example, one or more electrical conductors. Furthermore, one or more electrical and/or electronic components such as a protective filter and/or a voltage converter and/or a plug connection may be arranged in the respective connection.

Examples of a consumer of the trailer are a transport refrigeration machine, a drive of the trailer, a telematics unit, a lamp (for example a lamp located in the load space of the trailer), a device for the automated checking of a tire pressure and/or a camera. An example of a consumer of the motorized commercial vehicle is a drive of the motorized commercial vehicle.

According to an exemplary embodiment of the trailer, the trailer further contains:

a positioning device, which is configured to determine a position of the trailer.

For example, the positioning device can be part of a telematics unit of the trailer.

The positioning device may be or may include, for example, a position sensor of one or more Global Navigation Satellite Systems (GNSS) such as Naystar GPS, Galileo, Glonass and/or Beidou. For example, a position sensor of a global navigation satellite system is configured to determine the position of the trailer absolutely, for example in a global coordinate system such as WGS 84 (World Geodetic System 1984).

In particular, the positioning device may alternatively or additionally enable positioning based on radio signals. For example, the positioning device can determine a position of the trailer based on cellular, Wi-Fi and/or Bluetooth radio signals. For this purpose, the positioning device may be or may contain a radio communication interface such as a cellular, Wi-Fi and/or Bluetooth radio communication interface. Mobile radio standards are, for example, 2G, 3G, 4G or 5G, which are specified by the 3GPP organization and can be accessed inter alia at www.3gpp.org. For example, WLAN (Wireless Local Area Network) is specified in the IEEE 802.11 family standard, which is currently available at www.ieee.org. The Bluetooth specifications are currently available at www.bluetooth.org. Such a radio communication interface is configured, for example, to determine the position of the trailer relative to other transmitting and/or receiving equipment (for example WLAN access points or Bluetooth beacons or mobile phone base stations) of the respective radio signals. For example, the round-trip-time of radio signals between the radio communication interface of the trailer and other transmitting and/or receiving equipment can be determined. The respective distance of the trailer from the respective transmitting and/or receiving equipment can then be determined from the respective round-trip-time in order to determine the position of the trailer relative to the other transmitting and/or receiving devices by trilateration. Position determination based on round-trip time is supported, for example, by the WLAN specification IEEE 802.11mc. Alternatively or additionally, the position can also be determined, for example, as a position in the reception area of a transmitting and/or receiving equipment (for example a WLAN access point or a Bluetooth beacon or a mobile phone base station).

For example, the position of the trailer should be understood as a position of a reference point of the trailer. In this case, the positioning device can determine the position of the reference point.

The positioning device can be essentially in the form of one component. It is also possible that the positioning device has and/or contains several components. For example, the positioning device may contain a position sensor of a Global Navigation Satellite System and/or a radio communication interface. Furthermore, the positioning device may contain an evaluation unit and/or a control unit. For example, the evaluation unit and/or the control unit may be implemented together and/or each in the form of a microprocessor, a microcontrol unit, a microcontroller, a digital signal processor (DSP), an application-specific integrated circuit (ASIC) or a field programmable gate array (FPGA).

According to an exemplary embodiment of the trailer, the positioning device is further configured to determine the position of the current collector or the electrical contact element for an inverted current collector.

For example, the position of the current collector or the electrical contact element for an inverted current collector is to be understood as a position of a reference point located in the region of the current collector or the electrical contact element for an inverted current collector and/or on the current collector or the electrical contact element for an inverted current collector. For example, the reference point is chosen to represent the position of the contact area(s) of the current collector in the extended position or of the electrical contact element for an inverted current collector. For example, the positioning device, as disclosed above, is configured to determine the position of the reference point.

The position of the current collector or the electrical contact element for an inverted current collector can be determined in absolute or relative terms.

For example, if the position of the current collector or the electrical contact element for an inverted current collector is determined relatively, the position of the current collector can be determined relative to a charging infrastructure (for example a charging station) and/or part of the charging infrastructure. In particular, the position of the current collector can be determined relative to an electrical contact element of a charging infrastructure (for example an overhead line) or the position of the electrical contact element for an inverted current collector relative to an inverted current collector of a charging infrastructure.

The positioning device may be configured to quantitatively determine the position of the current collector or the electrical contact element for an inverted current collector. A relative position between the current collector or the electrical contact element for an inverted current collector and the charging infrastructure can be determined, for example, in the form of a distance vector between the position of the current collector or the electrical contact element for an inverted current collector and the position of the charging infrastructure. An absolute position of the current collector or the electrical contact element for an inverted current collector can be determined, for example, in the form of coordinates of a global coordinate system or a global satellite navigation system. In particular, a quantitative determination of the position allows for an exact quantification but may be less suitable for interpretation by a human operator.

The positioning device may be configured alternatively or in addition to determine the position of the current collector or the electrical contact element for an inverted current collector qualitatively. In particular, a qualitative determination of a position can be carried out by categorizing the position (for example based on a quantitatively determined position). For example, a position can be determined qualitatively by assigning one of several categories to the position as a position specification, which describes the location of the position relative to a reference position (for example the position of a charging infrastructure). Such a qualitative position specification can, for example, describe the distance of the position from the reference position (for example a position of a charging infrastructure) as "essentially identical", "very close", "close", "distant", "very far".

For example, the qualitative position of the current collector or the electrical contact element for an inverted current collector can be determined depending on the driving context of the trailer. The driving context of the trailer indicates the situation in which the trailer is currently located. For example, the trailer may be on a trip along a highway. In another example, the trailer could be at a petrol station or a logistics centre. Driving contexts can be differentiated and/or classified, for example, based on their typical average speed of the trailer in the respective driving context.

Because the qualitative position information is determined depending on the driving context, the categories of position information can be adapted to the respective driving context. In particular, the fineness of the classification of distance information can be dependent on and/or can be selected depending on the driving context. For example, in driving contexts with low average speeds, the classification may be finer than in driving contexts with higher average speeds. For example, the qualitative position specification for a low-speed manoeuvre in the vicinity of a reference position such as a charging infrastructure can be chosen with a finer classification of distance categories than on a motorway. For example, during a low-speed manoeuvre, a distance to the reference position could be divided into categories such as "very close (<0.5 m)", "close (<1 m)", "distant (<3 m)", "far away (>10 m)" or similar. For a driving context in which higher speeds are reached, the qualitative position specification can be given in coarser divisions based on the distance to the reference position, for example "very close (<100 m)", "close (<500 m)", "distant (<2 km)", "far away (>10 km)" or similar.

According to an exemplary embodiment of the trailer, the trailer contains means of autonomous or semi-autonomous control.

For example, autonomous control is to be understood to be a control system that runs independently of the operator's control commands, especially instantaneous control commands. However, even with such autonomous control, the operator can still make demands on the controller, such as specifying a destination and/or, for example, requesting a connection to a charging infrastructure. However, the actual current control of the trailer, such as steering and/or acceleration and/or braking, is controlled independently of the operator.

For this purpose, autonomous control can include, for example, direct control of at least one actuator (for example a motor) of the trailer. Autonomous control may also include the control of a motorised commercial vehicle, in particular a towing vehicle, in particular a towing vehicle to which the trailer is coupled. For example, the means of autonomous control of the trailer may control a propulsion engine and/or steering of the trailer and/or the motorized commercial vehicle coupled to it. The means of autonomous control of the trailer can also control the movement of the current collector from the retracted position to the extended position and/or vice versa, for example by controlling an actuator of the current collector.

In particular, a semi-autonomous control system should be understood as a control system that supports the operator in the instantaneous control of the trailer. For this purpose, the means of semi-autonomous control may realize a display of information that is useful, relevant, essential and/or otherwise relevant to the control. In this case, the means of control may include, for example, the output of information to assist the operator. Alternatively or additionally, the means of semi-autonomous control may, for example, strengthen or weaken control commands from an operator (for example concerning steering and/or acceleration and/or deceleration). Semi-autonomous control has the advantage of significantly simplifying the operation of the vehicle while at the same time being significantly simpler to implement compared to autonomous control.

In particular, a semi-autonomous control system can include the display of information that supports the operator in operating the trailer. Such information may include, for example, the current distance of the current collector or the electrical contact element for an inverted current collector from at least one reference position such as a charging infrastructure (for example an electrical contact element of the charging infrastructure or an inverted current collector of the charging infrastructure). This information can be displayed qualitatively or quantitatively in the sense described above.

Also, for example, control commands of the operator can be influenced by the means of semi-autonomous control. For example, the sensitivity of the steering can be adjusted depending on a driving context. For example, an increased sensitivity of the steering can be set in the vicinity of a reference position, which can be determined, for example, on the basis of the position determined by a positioning device. The acceleration and/or deceleration behaviour can also be influenced. This can simplify the low-speed manoeuvring behaviour of the trailer and/or of a combination of a trailer and a motorised commercial vehicle coupled to it.

The means of autonomous or semi-autonomous control may include one or more means. Examples of such means of autonomous or semi-autonomous control are a microprocessor, a microcontrol unit, a microcontroller, a digital signal processor (DSP), an application-specific integrated circuit (ASIC), or a field programmable gate array (FPGAs).

According to an exemplary embodiment of the trailer, the means of autonomous or semi-autonomous control are configured to control and/or support an approach of the current collector or the electrical contact element for an inverted current collector to a charging infrastructure by a movement of the trailer.

For example, controlling and/or assisting the approach of the current collector or the electrical contact element for an inverted current collector to a charging infrastructure by moving the trailer may be carried out based on a position of the trailer determined by the positioning device. For example, the position can be received by means of a communication bus or another communication link, for example. The means of control and the positioning device can also be integrated with each other.

The means of autonomous or semi-autonomous control are configured, for example, to autonomously control a propulsion engine and/or steering of the trailer and/or the motorised commercial vehicle coupled to the trailer in such a way that a movement of the trailer causes the current collector or the electrical contact element for an inverted current collector to approach the charging infrastructure. For example, the movement should bring the current collector closer to the charging infrastructure in such a way that the current collector in the extended position can establish a connection to a contact element of the charging infrastructure, or the electrical contact element for an inverted current collector can be contacted by an inverted current collector of the charging infrastructure (for example in an extended position of the inverted current collector of the charging infrastructure).

Alternatively or additionally, the means of autonomous or semi-autonomous control can assist the operator in causing a movement of the trailer that causes the current collector or the electrical contact element for an inverted current collector to approach the charging infrastructure. For example, the means of autonomous or semi-autonomous control may be configured to cause the operator to be shown a quantitative position (for example in the form of a distance vector) or qualitative position (for example in the form of a categorised distance indication such as "substantially identical", "very close", "near", "distant", "very far") of the current collector or the electrical contact element for an inverted current collector relative to the position of the charging infrastructure. In addition, the means of autonomous or semi-autonomous control may be configured to influence the operator's control commands depending on the quantitative position or qualitative position of the current collector or the electrical contact element for an inverted current collector relative to the position of the charging infrastructure. For example, the sensitivity of the steering can be increased as a result as soon as the distance between the current collector or the electrical contact element for an inverted current collector and the charging infrastructure is less than or equal to a specified threshold (for example "very close" or "close"). Similarly, the acceleration and/or deceleration behaviour can be influenced (for example by lowering the sensitivity of the accelerator pedal and increasing the sensitivity of the brake pedal as soon as the distance between the current collector or the electrical contact element for an inverted current collector and the charging infrastructure is less than or equal to the specified threshold).

BRIEF DESCRIPTION OF THE FIGURES

The subject matter is described below in more detail on the basis of a drawing showing exemplary embodiments. In the drawing.

DETAILED DESCRIPTION

Figure 1A:
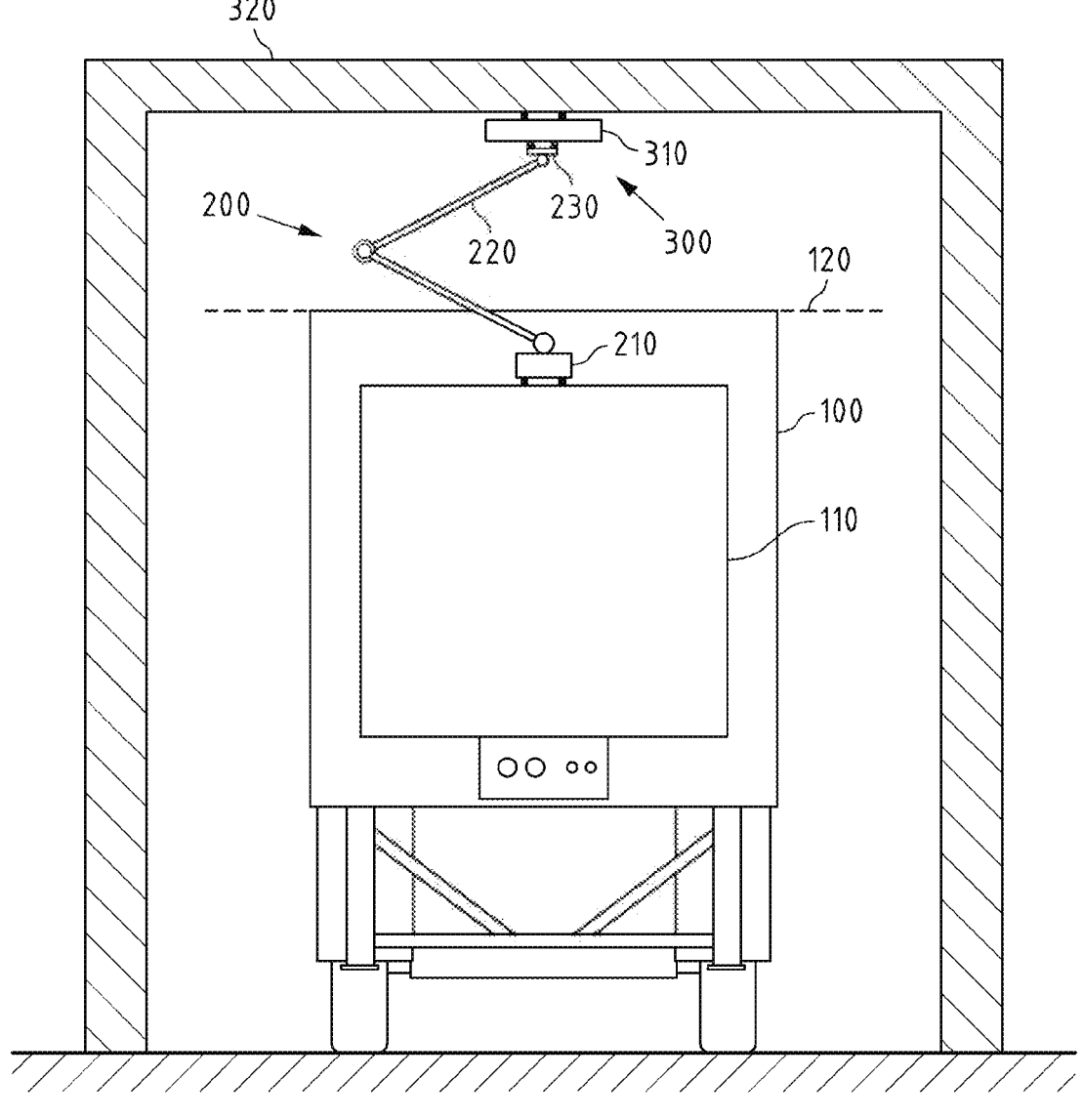
FIGS. 1a, 1b, 1c are a schematic representation of a disclosed trailer according to an exemplary embodiment, as well as a charging infrastructure.

FIG. 1a shows a schematic view of a disclosed trailer 100. A frontal view of the end wall can be seen with the direction of travel pointing out of the drawing plane. A transport refrigeration machine 110 is arranged on the end wall. A current collector 200 is positioned above the transport refrigeration machine. The current collector has an immovable part 210 and a movable part 220. In the version shown, the movable part 220 has two arms, which are connected by a joint. Also, the lower movable arm is connected with a joint to the immovable part of the current collector 200. The joints can be motorized, for example. At the upper end of the current collector 200 there is at least one electrical contact area 230.

The extended position of the current collector 200 is shown. In this position, the current collector 200 protrudes beyond an upper edge 120 of the trailer 100.

FIG. 1a also shows a charging infrastructure 300. The charging infrastructure 300 contains a frame 320 on which a charging station 310 is arranged. The current collector 200 comes into contact with its contact area 230 with a contact element of the charging station 310 of the charging infrastructure 300. In this way, the trailer 100 can draw electrical energy provided by the charging station 310 by means of the current collector 200.

Figures 1B, 1C:
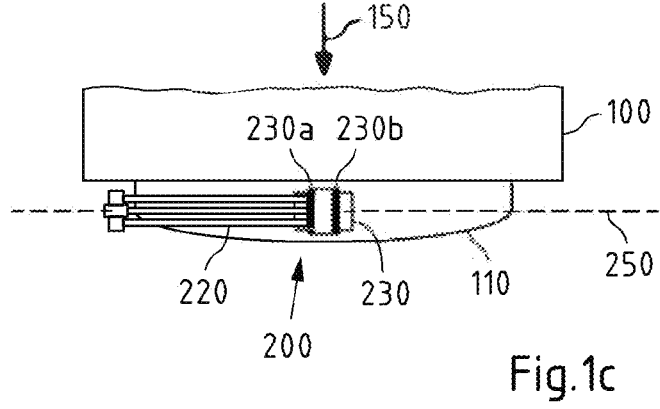

FIG. 1b shows a disclosed trailer 100 with a current collector 200 in the retracted position. In this position, the current collector 200 is located entirely below the top edge 120 of the trailer 100. Also, the current collector 200 does not protrude from the side edges 125a, 125b of the end wall of the trailer 100. The fact that the current collector 200 is located within the area of the end wall of the trailer 100 (projected in the direction of travel) and, in particular, does not protrude from its edges, means that the current collector 200 does not violate the size requirements for the trailer 100. The current collector 200 is also protected against airflow and other environmental influences.

FIG. 1c shows a top view of the trailer 100 in the area of its end wall, on which the transport refrigeration machine 110 and the current collector 200 are arranged. It can be seen that the current collector 200 does not protrude beyond the transport refrigeration machine 110 in the direction of travel. This is made possible, in particular, by the fact that the extension plane 250 of the current collector 200 is essentially perpendicular to the direction of travel 150 of the trailer 100. Furthermore, it can be seen that the area occupied by the immovable part 210 of the current collector 200 occupies only a small fraction of the area of the transport refrigeration machine 210 in a projection along the direction of gravity. The current collector 200 therefore does not impede the heat dissipation of the transport refrigeration machine 110 upwards. On the contrary, the branched structure of the current collector 200 may be conducive to heat dissipation via the current collector 200, in particular its moving parts 220. Furthermore, it can be seen in FIG. 1c that the current collector 200 has two contact areas 230a, 230b. In particular, the contact areas 230a, 230b are electrically isolated from each other.

Figure 2:
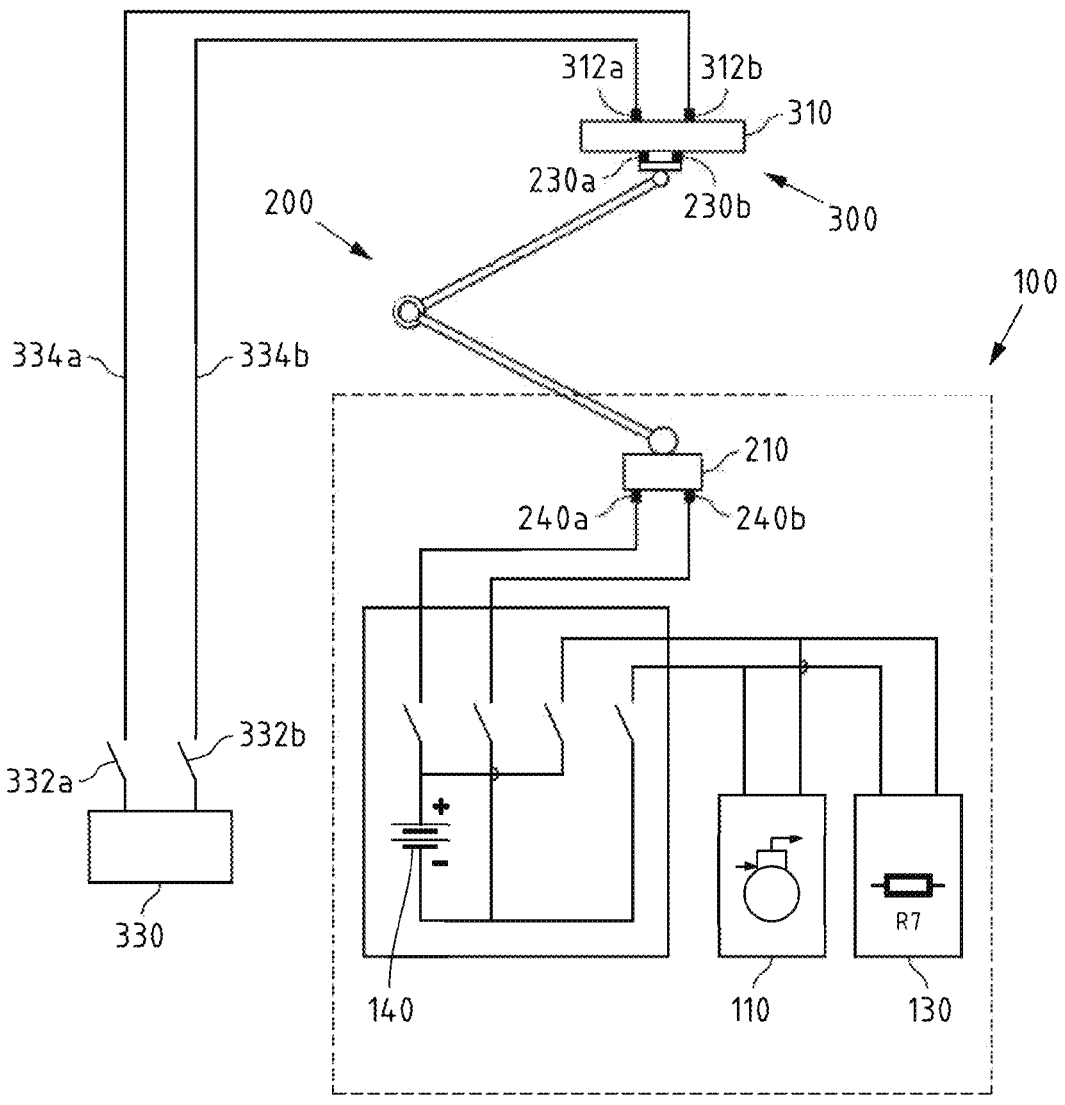
FIG. 2 is a schematic circuit diagram of a charging infrastructure as well as a trailer according to an exemplary embodiment.

FIG. 2 shows a schematic wiring diagram containing a charging infrastructure 301 and a disclosed trailer 100 according to an exemplary embodiment. The charging infrastructure 300 contains a power source 330, which can be in the form in particular of a direct current source. In particular, the power source 330 may be in the form of a charging station power source 330. Two switches 232a, 232b can disconnect and connect the power source 330 from supply lines 334a, 334b from and to a charging station 310, which is also contained in the charging infrastructure. The trailer 100 is mechanically and/or electrically connected to the charging station 310 of the charging infrastructure 300 by means of the extended current collector 200. In particular, at least two electrical contacts 312a, 312b of the charging station 310 are connected to two electrical contacts 240a, 240b of the current collector 200 by means of the contact areas 230a, 230b. Due to the two-pole connection type shown between the charging station 310 and the current collector 200, a closed circuit with inlet and outlet can be achieved.

The trailer 100 contains an energy storage device 140, which can be charged with the charging station 310 via the current collector 200. The trailer 100 also contains a transport refrigeration machine 110, which can be supplied with electrical energy in particular by means of the energy storage device 240 and/or directly by means of the current collector 200. The trailer 100 also contains other consumers 130, which, for example, perform assistance systems, load space lighting or other subordinate functions of the trailer 100.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A trailer for road vehicles comprising:
(i) a current collector extendable from a retracted position to an extended position, wherein:
the current collector is arranged adjacent to an end wall of the trailer pointing in a direction of travel of the trailer, wherein:
the current collector is arranged entirely below an upper edge of the end wall when in the retracted position, and wherein the current collector protrudes at least partly upwards from the upper edge of the end wall when in the extended position, or
(ii) an electrical contact element for an inverted current collector, wherein the electrical contact element for the inverted current collector is arranged adjacent to an end wall of the trailer pointing in a direction of travel of the trailer, wherein:
the electrical contact element for the inverted current collector is arranged entirely below the upper edge of the end wall.

2. The trailer according to claim 1, wherein a housing of a transport refrigeration system is arranged on the end wall, wherein the current collector or the electrical contact element for the inverted current collector is arranged at least partly above the housing of the transport refrigeration system and/or to the side of the housing of the transport refrigeration system, in particular with the current collector in the retracted position.

3. The trailer according to claim 2, wherein the current collector is attached to the housing of the transport refrigeration system.

4. The trailer according to claim 1, wherein the current collector is configured to establish contact with an electrical contact element of a charging infrastructure when in the extended position, or wherein the electrical contact element for the inverted current collector is configured to make contact with a second inverted current collector of a charging infrastructure.

5. The trailer according to claim 1, wherein the current collector is designed as a bow current collector, in particular as a scissors current collector, a triangular current collector, a single-arm current collector and/or combinations thereof.

6. The trailer according to claim 1, wherein the current collector is configured to be moved in an extension plane from the retracted position to the extended position, wherein the extension plane is oriented essentially perpendicular to the direction of travel.

7. The trailer according to claim 1, wherein the current collector does not protrude beyond any side edge of the end wall and/or any side wall of the trailer either in the extended position or in the retracted position.

8. The trailer according to claim 1, wherein the current collector or the electrical contact element for the inverted current collector comprises at least two electrical contact regions, which are spaced apart from each other in particular along a contact row axis, wherein the contact row axis is oriented essentially parallel to or perpendicular to the direction of travel and/or to an extension plane.

9. The trailer according to claim 1, further comprising:
a connector for making an electrical connection.

10. The trailer according to claim 1, wherein the trailer comprises an electrical energy storage.

11. The trailer according to claim 10, wherein the energy storage is configured to provide electrical energy for the operation of a consumer of the trailer and/or a consumer of a motorized commercial vehicle coupled to the trailer.

12. The trailer according to claim 1, further comprising:
a positioning device configured to determine a position of the trailer.

13. The trailer according to claim 12, wherein the positioning device is configured to determine the position of the current collector or the electrical contact element for the inverted current collector, in particular relative to at least part of a charging infrastructure.

14. The trailer according to claim 1, wherein the trailer comprises means for autonomous or semi-autonomous control.

15. The trailer according to claim 14, wherein the means for autonomous or semi-autonomous control are configured to control and/or support an approach of the current collector or the electrical contact element for the inverted current collector to a charging infrastructure by a movement of the trailer.

\* \* \* \* \*